United States Patent
Kitani et al.

(10) Patent No.: US 11,262,768 B2
(45) Date of Patent: Mar. 1, 2022

(54) CAP WITH ELECTROMAGNETIC PROPORTIONAL VALVE

(71) Applicant: KYB Corporation, Tokyo (JP)

(72) Inventors: Toshiyuki Kitani, Nagano (JP); Nobuyoshi Yoshida, Nagano (JP)

(73) Assignee: KYB CORPORATION, Tokyo (JP)

( * ) Notice: Subject to any disclaimer, the term of this patent is extended or adjusted under 35 U.S.C. 154(b) by 29 days.

(21) Appl. No.: 16/758,718

(22) PCT Filed: Mar. 22, 2019

(86) PCT No.: PCT/JP2019/012206
§ 371 (c)(1),
(2) Date: Apr. 23, 2020

(87) PCT Pub. No.: WO2019/208047
PCT Pub. Date: Oct. 31, 2019

(65) Prior Publication Data
US 2020/0363827 A1 Nov. 19, 2020

(30) Foreign Application Priority Data
Apr. 27, 2018 (JP) .............................. JP2018-087393

(51) Int. Cl.
*F16K 31/42* (2006.01)
*G05D 11/13* (2006.01)

(52) U.S. Cl.
CPC ............ *G05D 11/13* (2013.01); *F16K 31/426* (2013.01)

(58) Field of Classification Search
CPC ........ F16K 27/041; F16K 31/42; F16K 27/04; F16K 31/426; F15B 13/0842;
(Continued)

(56) References Cited

U.S. PATENT DOCUMENTS 2,615,466 A * 10/1952 Garde ................. F15B 13/0435
137/625.6
2,650,616 A * 9/1953 Wilkinson .............. F16K 31/42
251/30.01
(Continued)

FOREIGN PATENT DOCUMENTS

| EP | 0573191 A1 | 12/1993 |
| EP | 1207330 A2 | 5/2002 |
| JP | 2010-127373 A | 6/2010 |

*Primary Examiner* — Umashankar Venkatesan
(74) *Attorney, Agent, or Firm* — Rabin & Berdo, P.C.

(57) ABSTRACT

A cap with electromagnetic proportional valve, includes a pilot cap mounted on a valve housing and defining a pilot chamber, and an electromagnetic proportional valve mounted on the pilot cap and adapted to control a pressure of a working fluid supplied to the pilot chamber. The pilot cap includes a supply port into which a working fluid of a fluid pressure supply source is supplied, a discharge port from which the working fluid is discharged to the tank, a primary pressure passage which leads the working fluid at a primary pressure to the electromagnetic proportional valve from the supply port, a secondary pressure passage which leads the working fluid whose pressure is reduced to a secondary pressure by the electromagnetic proportional valve to the pilot chamber, and a drain passage which leads the working fluid discharged from the electromagnetic proportional valve to the discharge port.

6 Claims, 6 Drawing Sheets

(58) Field of Classification Search
CPC .............. F15B 13/2871; F15B 13/0433; F15B 2013/006; F15B 2211/355; F15B 2211/329; F15B 2211/327; F15B 2211/6355; G05D 11/13
See application file for complete search history.

(56) References Cited

U.S. PATENT DOCUMENTS

| | | | | | |
|---|---|---|---|---|---|
| 3,270,776 | A | * | 9/1966 | Carls | F15B 13/0431 137/625.64 |
| 4,257,572 | A | * | 3/1981 | Neff | F15B 13/0431 137/513.5 |
| 4,986,299 | A | * | 1/1991 | Schultz | F16K 31/42 137/269 |
| 5,385,171 | A | * | 1/1995 | Cleasby | F15B 13/0402 137/596.17 |
| 6,601,821 | B2 | * | 8/2003 | Tyler | F15B 13/0433 251/30.02 |
| 2005/0044858 | A1 | * | 3/2005 | Hooker | G05D 16/2097 60/782 |
| 2008/0047617 | A1 | * | 2/2008 | Hirano | F15B 13/0433 137/487.5 |
| 2015/0152973 | A1 | * | 6/2015 | Mesner | F16K 31/42 251/30.01 |
| 2021/0025409 | A1 | * | 1/2021 | Kayabas | F15B 13/0402 |

* cited by examiner

CAP WITH ELECTROMAGNETIC PROPORTIONAL VALVE

TECHNICAL FIELD

The present invention relates to a cap with electromagnetic proportional valve.

BACKGROUND ART

A control valve adapted to control a flow of a working oil by controlling a pilot pressure through an electromagnetic proportional valve is known (see JP2010-127373A). In the control valve described in JP2010-127373A, an oil passage which allows a pump to communicate with an electromagnetic proportional valve, an oil passage which allows the electromagnetic proportional valve to communicate with a pilot chamber, and an oil passage which allows the electromagnetic proportional valve to communicate with a tank are provided in a body (valve housing).

SUMMARY OF INVENTION

Since the control valve described in JP2010-127373A is configured such that the pilot pressure is controlled by the electromagnetic proportional valve, the oil passage which allows the pump to communicate with the electromagnetic proportional valve, the oil passage which allows the electromagnetic proportional valve to communicate with the pilot chamber, and the oil passage which allows the electromagnetic proportional valve to communicate with the tank are provided in the valve housing in advance. On the other hand, in the case of a control valve configured not control the pilot pressure by the electromagnetic proportional valve, the aforementioned oil passages are not provided in the valve housing.

Thus, when a specification is changed to control of the pilot pressure by the electromagnetic proportional valve later, it was necessary that the electromagnetic proportional valve is provided separately from the control valve, the electromagnetic proportional valve and the control valve are connected by a pipeline, and the valve housing is replaced with the one in which the aforementioned oil passages are provided in advance, and specification change could not be made easily.

The present invention has an object to easily realize a change from the specification not to control the pilot pressure by the electromagnetic proportional valve to the specification to control the same.

According to an aspect of the present invention, a cap with electromagnetic proportional valve, includes a pilot cap mounted on a valve housing in which a spool is incorporated and which defines a pilot chamber with the valve housing; and an electromagnetic proportional valve mounted on the pilot cap and adapted to control a pressure of a working fluid supplied to the pilot chamber. The pilot cap includes a supply port into which a working fluid of a fluid pressure supply source is supplied; a discharge port from which the working fluid is discharged to the tank; a primary pressure passage which leads the working fluid at a primary pressure to the electromagnetic proportional valve from the supply port; a secondary pressure passage which leads the working fluid whose pressure is reduced to a secondary pressure by the electromagnetic proportional valve to the pilot chamber; and a drain passage which leads the working fluid discharged from the electromagnetic proportional valve to the discharge port.

DESCRIPTION OF EMBODIMENTS

Figure 1:
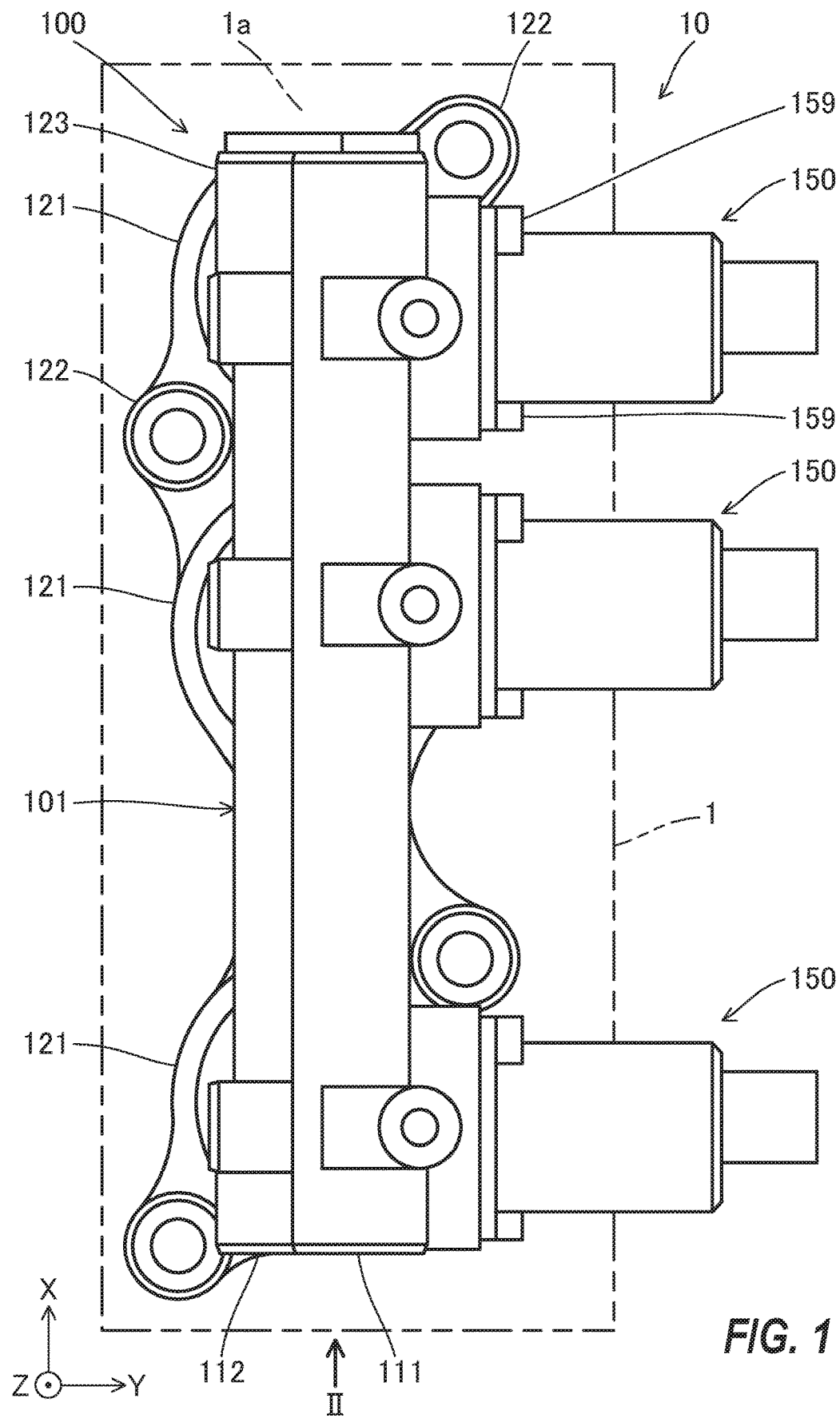
FIG. 1 is a plan view of a cap with electromagnetic proportional valve according to an embodiment of the present invention.
Figure 2:
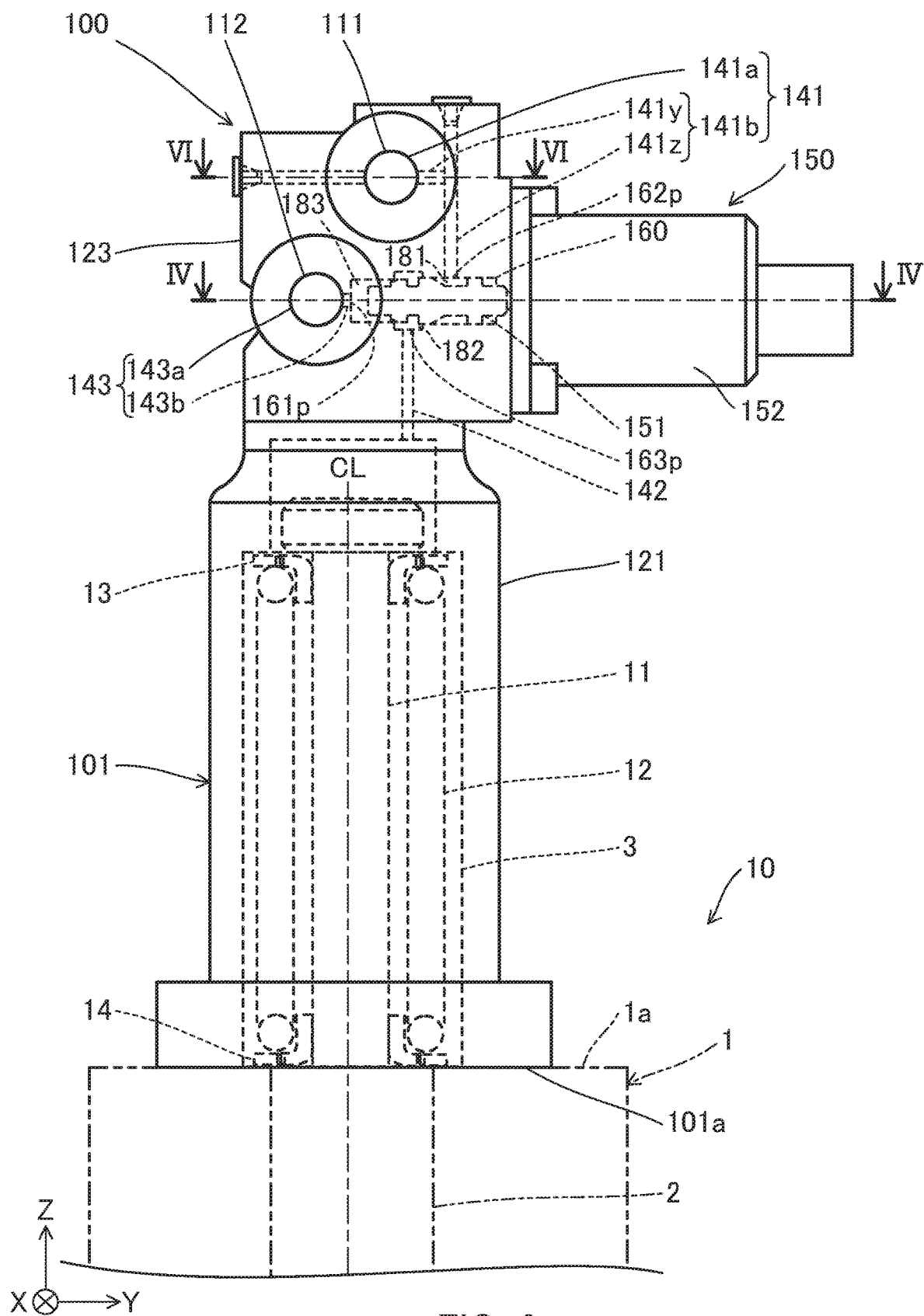
FIG. 2 is a side view of the cap with electromagnetic proportional valve when seen from a II direction in FIG. 1.

A control valve including a cap with electromagnetic proportional valve according to an embodiment of the present invention will be described by referring to the drawings. FIG. 1 is a plan view of a cap 100 with electromagnetic proportional valve, and FIG. 2 is a side view of the cap 100 with electromagnetic proportional valve when seen from a II direction in FIG. 1. In FIGS. 1 and 2, a valve housing 1 on which the cap 100 with electromagnetic proportional valve is mounted and a spool 2 provided in the valve housing 1 are indicated by a two-dot chain line.

As illustrated in FIGS. 1 and 2, the control valve 10 is for controlling an operation of an actuator by switching supply/discharge of a working fluid with respect to the actuator. An example in which a working oil is used as the working fluid will be described, but other fluids such as working water may be used as the working fluid.

The control valve 10 includes the valve housing 1 having a cuboid shape, a plurality of the spools 2 slidably incorporated in the valve housing 1, and the cap 100 with electromagnetic proportional valve in which a plurality of pilot chambers 3 corresponding to the plurality of spools 2 are provided.

The cap 100 with electromagnetic proportional valve includes a pilot cap (hereinafter referred to as a cap) 101 mounted on a side surface 1a of the valve housing 1 and defining the pilot chamber 3 with the valve housing 1 and an electromagnetic proportional valve 150 mounted on the cap 101 and adapted to control a pressure of the working oil supplied to the pilot chamber 3. The electromagnetic proportional valves 150 are provided in plural correspondingly to the plurality of pilot chambers 3.

In the following description, an axial direction of the spool 2, that is, a center axis CL direction of the spool 2 and also a direction in which the spool 2 is moved is also referred to as a Z-direction. The plurality of spools 2 and the plurality of pilot chambers 3 are aligned in a direction orthogonal to the axial direction of the spool 2. Thus, the aligned direction of the spool 2 which is a direction orthogonal to the axial direction (Z-direction) of the spool 2, that is, an aligned direction of the pilot chamber 3 is also referred to as an X-direction. Moreover, a width direction of the cap 101, that is, a direction orthogonal to each of the axial direction (Z-direction) of the spool 2 and the aligned direction (X-direction) of the spool 2 is also referred to as a Y-direction.

The cap 101 has a cylindrical cylinder portion 121 provided coaxially with the spool 2, a plurality of bolted portions 122 protruding outward in a radial direction from the cylinder portion 121, and a projecting end portion 123 protruding to a side opposite to the valve housing 1 along the axial direction (Z-direction) of the spool 2 from the cylinder portion 121. The projecting end portion 123 is provided so as to connect the plurality of cylinder portions 121.

The cap 101 has a mounting surface 101a mounted on the side surface 1a of the valve housing 1. When a bolt is inserted into the bolted portion 122, and the bolt is screwed into a threaded portion of the valve housing 1, the cap 101 is fixed to the valve housing 1 in a state where the mounting surface 101a of the cap 101 abuts to the side surface 1a of the valve housing 1.

As illustrated in FIG. 2, when the cap 101 is mounted on the valve housing 1, the pilot chamber 3 with which one end of the spool 2 is faced is defined. A centering spring 12 as a biasing member which gives a spring force to the one end of the spool 2 is accommodated/fitted in the pilot chamber 3. A rod (spool end) 11 extending into the pilot chamber 3 is coupled with the one end of the spool 2. A pair of spring receiving members 13 and 14 which are slidable along an outer periphery of the rod 11 is accommodated in the pilot chamber 3, and the centering spring 12 is interposed between the pair of spring receiving members 13 and 14.

Figure 3:
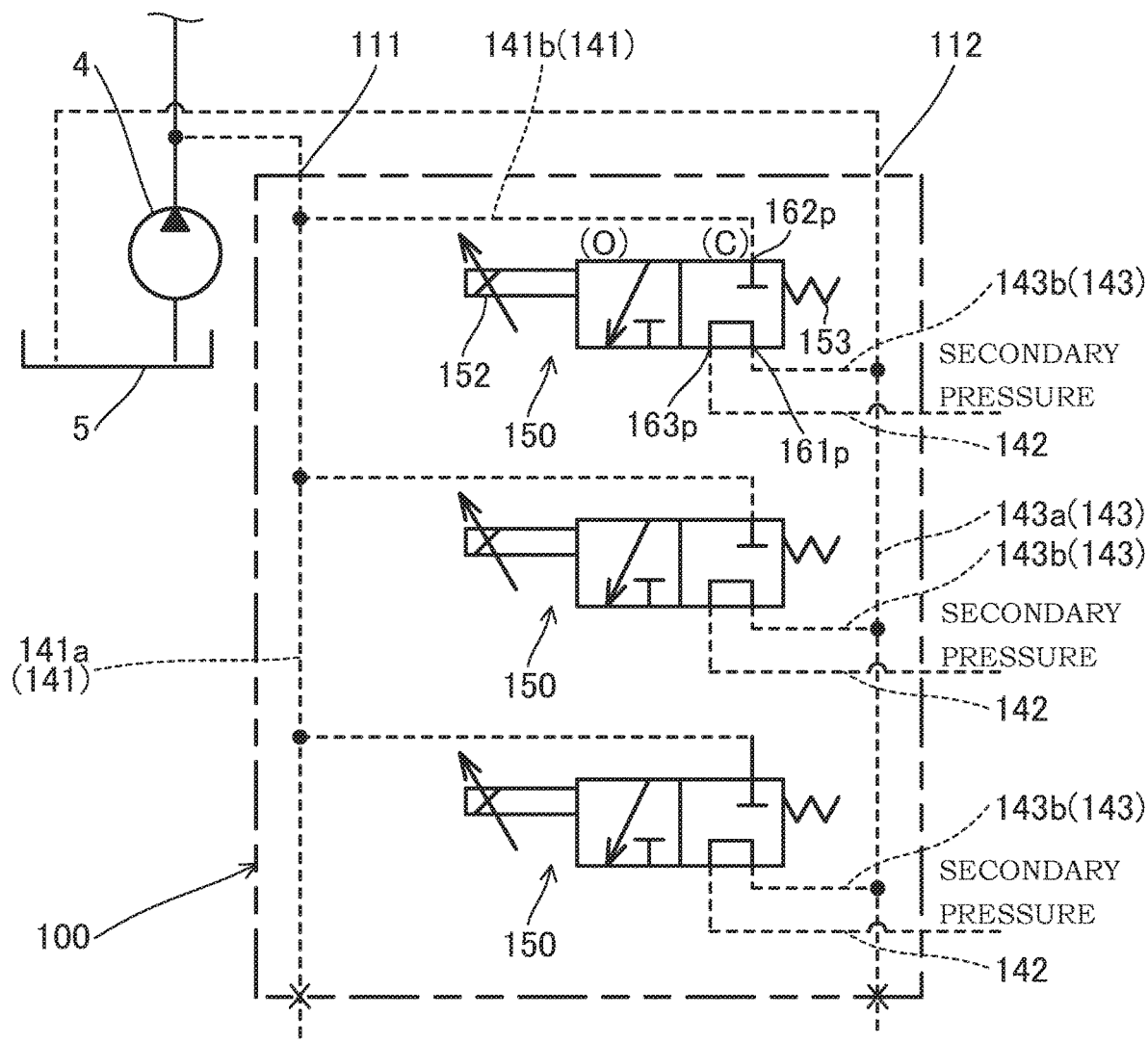
FIG. 3 is a hydraulic circuit diagram including the electromagnetic proportional valve which supplies a pilot pressure to a pilot chamber.

Configuration of a hydraulic circuit in the cap 100 with electromagnetic proportional valve will be described by referring to FIG. 3. FIG. 3 is a hydraulic circuit diagram including the electromagnetic proportional valve 150 adapted to supply the pilot pressure to the pilot chamber 3.

As illustrated in FIG. 3, the cap 101 has a supply port 111 to which the working oil discharged from a hydraulic pump 4 as a fluid pressure supply source is supplied, a discharge port 112 from which the working oil is discharged to a tank 5 in which the working oil is stored, a primary pressure passage 141 which leads the working oil at a primary pressure to the electromagnetic proportional valve 150 from the supply port 111, a secondary pressure passage 142 which leads the working oil whose pressure is reduced to a secondary pressure by the electromagnetic proportional valve 150 to the pilot chamber 3, and a drain passage 143 which leads the working oil discharged from the electromagnetic proportional valve 150 to the discharge port 112.

As illustrated in FIG. 2, the supply port 111 and the discharge port 112 are provided on a surface different from the mounting surface 101a. In this embodiment, the supply port 111 and the discharge port 112 are juxtaposed/provided on one end surface of the cap 101 in the longitudinal direction (X-direction).

As illustrated in FIG. 3, the electromagnetic proportional valve 150 has a valve body 151 (see FIGS. 4 and 5), a solenoid 152 which gives a thrust to the valve body 151, and a coil spring 153 as a biasing member which gives a biasing force in a direction against the thrust of the solenoid 152 to the valve body 151.

The electromagnetic proportional valve 150 controls the secondary pressure (pilot pressure) output to the pilot chamber 3 in accordance with a control current supplied to the solenoid 152. The electromagnetic proportional valve 150 according to this embodiment is a direct proportional pressure reducing valve in which the higher the current supplied to the solenoid 152 becomes, the more the secondary pressure is raised.

The primary pressure passage 141 has a main primary pressure passage 141a extending from the supply port 111 and a sub primary pressure passage 141b having one end connected to the main primary pressure passage 141a and the other end connected to the electromagnetic proportional valve 150. The sub primary pressure passages 141b are provided in plural correspondingly to each of the electromagnetic proportional valves 150. The secondary pressure passages 142 are provided in plural correspondingly to each of the electromagnetic proportional valves 150.

The drain passage 143 has a main drain passage 143a extending from the discharge port 112 and a sub drain passage 143b having one end connected to the main drain passage 143a and the other end connected to the electromagnetic proportional valve 150. The sub drain passages 143b are provided in plural correspondingly to each of the electromagnetic proportional valves 150.

The electromagnetic proportional valve 150 has an input port 162p to which the working oil at the primary pressure is led from the primary pressure passage 141, an output port 163p which leads the working oil at the secondary pressure to the secondary pressure passage 142, and a drain port 161p which leads drain to the drain passage 143.

The electromagnetic proportional valve 150 is operated between a closed position (C) where communication between the input port 162p and the output port 163p is shut off, and the output port 163p and the drain port 161p communicate with each other and an open position (O) where the input port 162p and the output port 163p communicate with each other, and the communication between the output port 163p and the drain port 161p is shut off. At an intermediate position between the closed position (C) and the open position (O), the input port 162p communicates with both the output port 163p and the drain port 161p through a throttled part.

Figure 4:
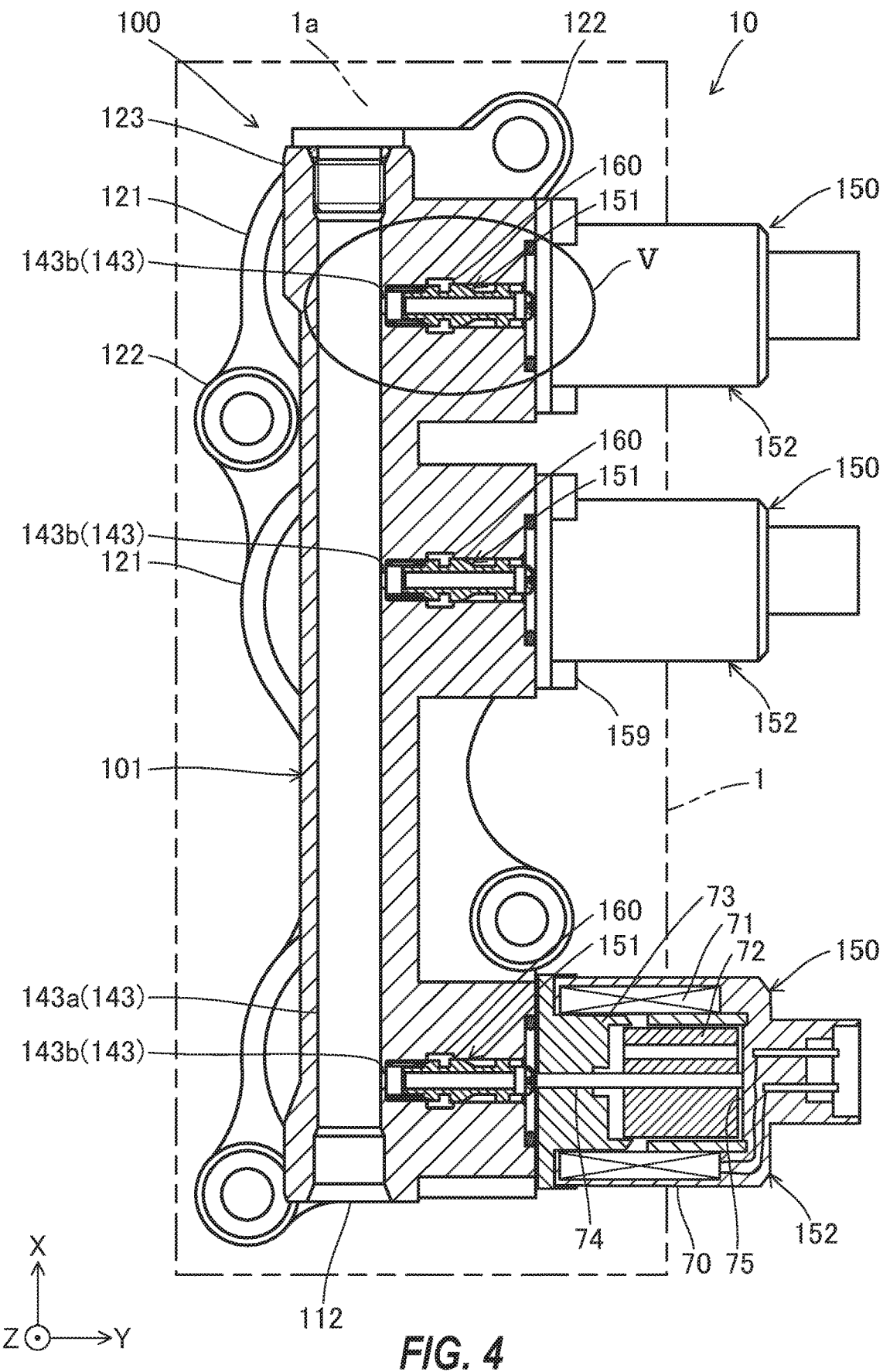
FIG. 4 is a sectional view of the cap with electromagnetic proportional valve along a IV-IV line in FIG. 2.
Figure 5:
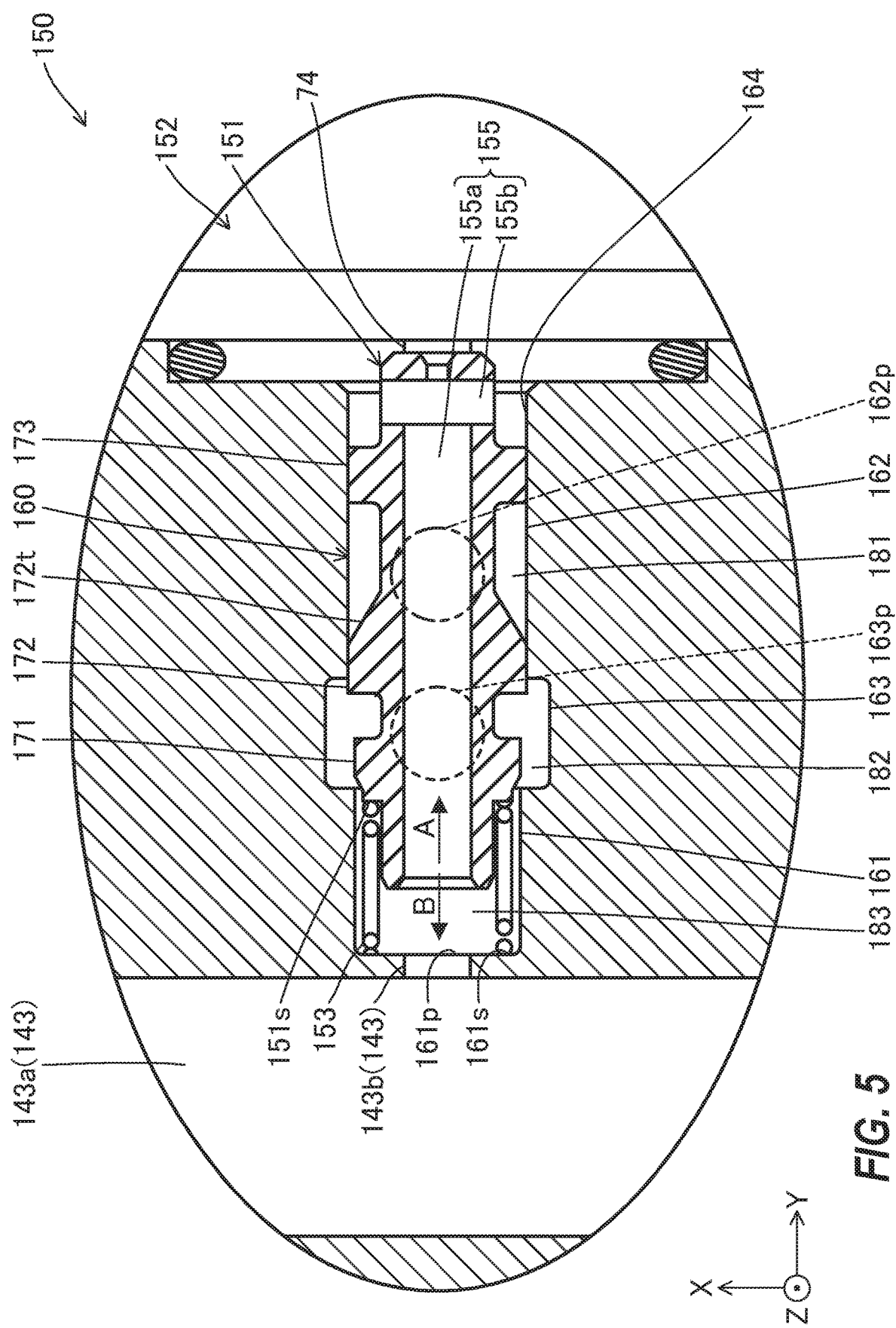
FIG. 5 is an enlarged sectional view of the cap with electromagnetic proportional valve in which V part in FIG. 4 is enlarged.
Figure 6:
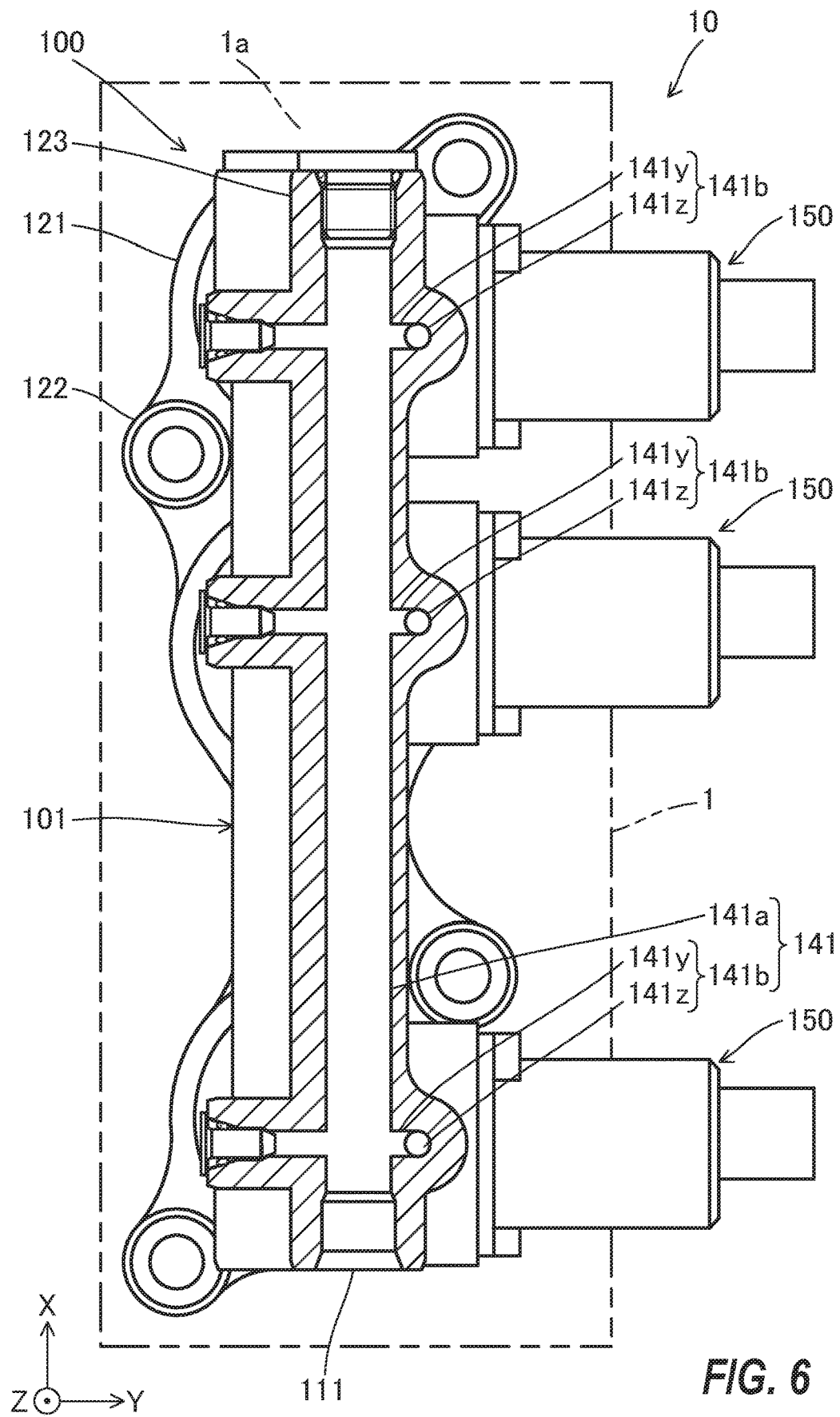
FIG. 6 is a sectional view of the cap with electromagnetic proportional valve along a VI-VI line in FIG. 2.

Configuration of the electromagnetic proportional valve 150 and the passages provided in the cap 101 will be described by referring to FIGS. 2 and 4 to 6. FIG. 4 is a sectional view of the cap 100 with electromagnetic proportional valve along a IV-IV line in FIG. 2 and illustrates configuration of the electromagnetic proportional valve 150. FIG. 5 is an enlarged sectional view of the cap 100 with electromagnetic proportional valve in which V part in FIG. 4 is enlarged. FIG. 6 is a sectional view of the cap 100 with electromagnetic proportional valve along a VI-VI line in FIG. 2.

As illustrated in FIG. 4, the solenoid 152 is fixed to the cap 101 by a bolt 159. The solenoid 152 includes a coil 71 which generates a magnetic force in accordance with a control current supplied from an external device, a fixed iron core (fixed core) 73 excited by the magnetic force of the coil 71, a movable iron core (plunger) 72 which is attracted to the excited fixed iron core 73 and is moved in an axial direction, and a push rod 74 which is fixed to the movable iron core 72 and is moved in the axial direction together with the movable iron core 72. A stopper portion 75 to which one end of the push rod 74 penetrating the movable iron core 72 abuts is provided in a case 70 of the solenoid 152.

As illustrated in FIGS. 4 and 5, the cap 101 has an accommodating chamber 160 which accommodates the valve body 151. The valve body 151 is provided slidably in a direction (Y-direction) orthogonal to each of the axial direction (Z-direction) of the spool 2 and the primary main primary pressure passages 141a extending in the aligned direction (X-direction) of the spool 2. The solenoid 152 gives a thrust to one end portion (right end portion in the illustration) of the valve body 151, and the coil spring 153 gives a biasing force against the thrust by the solenoid 152 to the other end portion (left end portion in the illustration) of the valve body 151.

The accommodating chamber 160 has a first sliding portion 161 provided on a left end side in the illustration of the accommodating chamber 160, a second sliding portion 162 provided on a right end side in the illustration of the accommodating chamber 160, and an annular recess portion 163 provided between the first sliding portion 161 and the second sliding portion 162. The first sliding portion 161, the second sliding portion 162, and the annular recess portion 163 have sections with circular openings around a center axis of the valve body 151. An inner diameter of the second sliding portion 162 is larger than the inner diameter of the first sliding portion 161, and the inner diameter of the annular recess portion 163 is larger than the inner diameter of the second sliding portion 162.

The valve body 151 is a shaft member having a base end portion (right end portion in the illustration) fixed to the push rod 74 of the solenoid 152. On the valve body 151, a first land portion 171, a second land portion 172, and a third portion 173 are provided in this order from a distal end side (left end side in the illustration) of the valve body 151 toward the base end side (right end side in the illustration). Each of the land portions 171, 172, and 173 protrudes outward in the radial direction. Each of the land portions 171, 172, and 173 is provided separately from each other in the center axis direction (Y-direction) of the valve body 151. A space among each of the land portions 171, 172, and 173 is formed as an annular groove dented inward in the radial direction.

The first land portion 171 slides along an inner peripheral surface of the first sliding portion 161, and the second land portion 172 and the third land portion 173 slide along the inner peripheral surface of the second sliding portion 162. An outer diameter of the second land portion 172 and the outer diameter of the third land portion 173 are identical. The outer diameters of the second and third land portions 172 and 173 are larger than the outer diameter of the first land portion 171. The second land portion 172 has a taper portion 172t whose outer diameter becomes gradually smaller toward the base end side of the valve body 151 from a sliding contact portion in sliding contact with the inner peripheral surface of the second sliding portion 162.

The accommodating chamber 160 has a drain chamber 183 defined by the first sliding portion 161 and the valve body 151, a primary pressure chamber 181 defined by the second sliding portion 162 and the valve body 151, and a secondary pressure chamber 182 defined by the annular recess portion 163 and the valve body 151. A rod chamber 164 where the push rod 74 goes in/out is defined between the third land portion 173 and the solenoid 152.

As illustrated in FIGS. 2 and 5, the input port 162p which is an opening end portion of the sub primary pressure passage 141b is provided on the inner peripheral surface of the second sliding portion 162. As a result, the primary pressure chamber 181 communicates with the primary pressure passage 141 through the input port 162p. The output port 163p which is an opening end portion of the secondary pressure passage 142 is provided on a bottom surface of the annular recess portion 163. As a result, the secondary pressure chamber 182 communicates with the secondary pressure passage 142 through the output port 163p. The drain port 161p which is an opening end portion of the sub drain passage 143b is provided on a supporting surface 161s of the coil spring 153 provided on the first sliding portion 161. As a result, the drain chamber 183 communicates with the drain passage 143 through the drain port 161p.

As illustrated in FIG. 5, the second land portion 172 constitutes a pressure receiving portion in which the secondary pressure acts in a direction of an arrow A. The direction of the arrow A is a direction in which the coil spring 153 biases the valve body 151 and is a direction against the thrust of the solenoid 152.

In a state where the first land portion 171 is located on the first sliding portion 161, a pressure receiving area of the second land portion 172 on which the secondary pressure acts is larger than the pressure receiving area of the first land portion 171. Thus, the thrust by the secondary pressure, that is, the thrust for a difference of the pressure receiving area between the second land portion 172 with a large diameter and the first land portion 171 with a small diameter acts on the valve body 151 toward the direction of the arrow A.

The coil spring 153 is accommodated in the first sliding portion 161. The first sliding portion 161 is provided so as to face a distal end surface of the valve body 151 and has the supporting surface 161s which supports one end of the coil spring 153. The other end of the coil spring 153 abuts to a spring receiving surface 151s of the valve body 151. The coil spring 153 is interposed between the supporting surface 161s and the spring receiving surface 151s in a compressed state. The coil spring 153 is contracted in accordance with a moving amount of the valve body 151 and gives a biasing force according to a contracted amount (elastic deformation amount) from a natural length to the valve body 151. That is, the coil spring 153 biases the valve body 151 to the direction of the arrow A toward the solenoid 152.

As described above, a thrust by the solenoid 152 acts on the valve body 151 to the direction of an arrow B, and a thrust by the biasing force by the coil spring 153 and the secondary pressure acts on the same to the direction of the arrow A.

The electromagnetic proportional valve 150 controls the secondary pressure (pilot pressure) output to the pilot chamber 3 by adjusting communication of the output port 163p to the input port 162p and the drain port 161p by a balance of a thrust Fs by the solenoid 152 to the valve body 151, a biasing force Fk by the coil spring 153, and a thrust Fa by the secondary pressure.

In a non-conductive state where a current does not flow through the solenoid 152, the valve body 151 is disposed at the closed position (C) which is an initial position illustrated in FIG. 5 by the biasing force of the coil spring 153. In the state where the valve body 151 is disposed at the closed position (C), the push rod 74 abuts to the stopper portion 75 in the case 70 of the solenoid 152. At the closed position (C), an initial load according to a set length of the coil spring 153 acts on the valve body 151.

In the state where the valve body 151 is disposed at the closed position (C), the second land portion 172 is located in the second sliding portion 162 and shuts off the communication between the input port 162p and the output port 163p. At this time, the first land portion 171 is located outside the first sliding portion 161, and the output port 163p and the drain port 161p communicate with each other.

When the current flows through the solenoid 152, a thrust by the solenoid 152 is generated, and the valve body 151 is moved to the left in the illustration. In a state where the valve body 151 is disposed at the open position (O), the second land portion 172 is located outside the second sliding portion 162, and the input port 162p and the output port 163p communicate with each other. At this time, the first land portion 171 is located in the first sliding portion 161 and shuts off the communication between the output port 163p and the drain port 161p.

That is, the first land portion 171 moves between the closed position (C) which allows the flow of the working oil form the output port 163p to the drain port 161p and the open position (O) which prohibits the flow of the working oil from the output port 163*p* to the drain port 161*p*. The second land portion 172 is moved between the open position (O) which allows the flow of the working oil from the input port 162*p* to the output port 163*p* and the closed position (C) which prohibits the flow of the working oil from the input port 162*p* to the output port 163*p*.

An internal passage 155 having a vertical hole 155*a* penetrating in the axial direction and a lateral hole 155*b* penetrating in the radial direction is provided in the valve body 151. An opening portion faced with the drain chamber 183 is provided on the one end side of the vertical hole 155*a*. The lateral hole 155*b* is provided on the other end of the vertical hole 155*a*, and an opening portion of the lateral hole 155*b* is faced with the rod chamber 164. The internal passage 155 allows the drain chamber 183 and the rod chamber 164 to communicate with each other regardless of the moving amount of the valve body 151.

As illustrated in FIGS. 2 and 6, the main primary pressure passage 141*a* extends linearly along the direction (X-direction) orthogonal to the axial direction (Z-direction) of the spool 2 from the support port 111. The main primary pressure passage 141*a* is a through hole provided linearly by drilling work or the like, an opening on the one end side of the through hole is made the supply port 111, while the opening on the other end side is closed by a plug.

The sub primary pressure passage 141*b* has a y-direction hole 141*y* provided linearly along the Y-direction so as to penetrate the main primary pressure passage 141*a* and a z-direction hole 141*z* provided linearly along the Z-direction so as to penetrate the y-direction hole 141*y*. The y-direction hole 141*y* and the z-direction hole 141*z* are provided by drilling work or the like, and opening end portions of the y-direction hole 141*y* and the z-direction hole 141*z* are closed by a plug.

The plurality of sub primary pressure passages 141*b* allows communication between the main primary pressure passage 141*a* and the primary pressure chamber 181 provided correspondingly to each of the plurality of electromagnetic proportional valves 150.

As illustrated in FIG. 2, the secondary pressure passage 142 extends linearly along the axial direction (Z-direction) of the spool 2 from the output port 163*p* and allows the secondary pressure chamber 182 and the pilot chamber 3 to communicate with each other.

As illustrated in FIGS. 2, 4, and 5, the main drain passage 143*a* extends linearly along the direction (X-direction) orthogonal to the axial direction (Z-direction) of the spool 2 from the discharge port 112. The main drain passage 143*a* is a through hole provided linearly by drilling work or the like, and the opening on the one end side of the through hole is made the discharge port 112, while the opening on the other end side is closed by a plug.

The sub drain passage 143*b* extends linearly along the center axis direction (Y-direction) of the valve body 151. The plurality of sub drain passages 143*b* allows the main drain passage 143*a* and the drain chamber 183 provided correspondingly to each of the plurality of electromagnetic proportional valves 150 to communicate with each other.

As described above, in this embodiment, the main primary pressure passage 141*a* and the main drain passage 143*a* can be used in common with respect to the plurality of electromagnetic proportional valves 150. Thus, according to this embodiment, the size of the cap 101 can be reduced as compared with a case where an exclusive passage which allows the supply port and the electromagnetic proportional valve to communicate with each other is provided for each of the plurality of electromagnetic proportional valves.

The main primary pressure passage 141*a* and the main drain passage 143*a* are provided so as to be in parallel with each other. Therefore, according to this embodiment, the size of the cap 101 can be further reduced as compared with a case where main primary pressure passage 141*a* and the main drain passage 143*a* are provided not in parallel with each other.

As illustrated in FIG. 2, the main primary pressure passage 141*a* and the main drain passage 143*a* have center axes provided at positions shifted from each other in the axial direction (Z-direction) of the spool 2 and the axial direction (Y-direction) of the valve body 151.

Therefore, according to this embodiment, a Z-direction dimension of the cap 101 can be reduced as compared with a case where the main primary pressure passage 141*a* and the main drain passage 143*a* are provided so that the center axis of the main primary pressure passage 141*a* and the center axis of the main drain passage 143*a* are overlapped with each other when seen from the Z-direction. Moreover, according to this embodiment, the Y-direction dimension of the cap 101 can be reduced as compared with a case where the main primary pressure passage 141*a* and the main drain passage 143*a* are provided so that the center axis of the main primary pressure passage 141*a* and the center axis of the main drain passage 143*a* are overlapped with each other when seen from the Y-direction. That is, in this embodiment, since the main primary pressure passage 141*a* and the main drain passage 143*a* are provided at positions shifted in the Y-direction and in the Z-direction, the size of the cap 101 can be further reduced.

The main primary pressure passage 141*a* is disposed so as to face the pilot chamber 3 with the valve body 151 between them, the main drain passage 143*a* is disposed so as to face the solenoid 152 with the valve body 151 between them. In other words, the valve body 151 is disposed between the pilot chamber 3 and the main primary pressure passage 141*a* and between the solenoid 152 and the main drain passage 143*a*.

Therefore, according to this embodiment, in FIG. 2, for example, the Y-direction dimension of the cap 101 can be reduced, and the size of the cap 101 can be further reduced as compared with a case where the main primary pressure passage 141*a* is provided so as to be located closer to the left side in the illustration than the main drain passage 143*a*.

An operation of the electromagnetic proportional valve 150 will be described.

In a state where the current does not flow through the coil 71 of the solenoid 152, the valve body 151 is biased to the direction of the arrow A by a biasing force by the coil spring 153 and is located at the closed position (C). At the closed position (C), the first land portion 171 is disposed between the first sliding portion 161 and the second sliding portion 162, and the output port 163*p* and the drain port 161*p* communicate with each other. On the other hand, the second land portion 172 is disposed in the second sliding portion 162, and the communication between the input port 162*p* and the output port 163*p* is shut off. Therefore, the pressure (secondary pressure) of the pilot chamber 3 connected to the output port 163*p* is a tank pressure.

When a control current is supplied to the coil 71 of the solenoid 152, the fixed iron core 73 is excited by the magnetic field generated around the coil 71, and the movable iron core 72 is attracted toward the fixed iron core 73 in the axial direction. The solenoid 152 gives the thrust Fs to the valve body 151 through the push rod 74 by an electromagnetic force according to a current value flowing through the coil 71. When the thrust Fs by the solenoid 152 to the valve body 151 exceeds the biasing force Fk by the coil spring 153, the valve body 151 is moved to the other in the axial direction (the direction of the arrow B).

As a result, the second land portion 172 is disposed between the first sliding portion 161 and the second sliding portion 162, and the input port 162p and the output port 163p communicate with each other. On the other hand, the first land portion 171 is disposed in the first sliding portion 161, and the communication between the output port 163p and the drain port 161p is shut off.

Therefore, the working oil led to the primary pressure chamber 181 from the input port 162p is led to the secondary pressure chamber 182 through a gap between the outer peripheral surface of the valve body 151 and the inner peripheral surface of the second sliding portion 162, discharged from the output port 163p, and is led to the pilot chamber 3. The pressure in the pilot chamber 3, that is, the secondary pressure is raised by the supply of the working oil to the pilot chamber 3.

A hydraulic force of a difference portion between the pressure receiving area of the second land portion 172 and the first land portion 171 acts on the valve body 151 as the thrust Fa pressing the valve body 151 to the direction of the arrow A by the secondary pressure. While a sum of the thrust Fa by the secondary pressure and the biasing force Fk by the coil spring 153 is smaller than the thrust Fs by the solenoid 152, the valve body 151 is moved to the direction of the arrow B. That is, an opening area between the outer peripheral surface of the taper portion 172t of the valve body 151 and the inner peripheral surface of the second sliding portion 162 is increased, and the secondary pressure is raised.

When the secondary pressure is raised, and the sum of the thrust Fa by the secondary pressure and the biasing force Fk by the coil spring 153 becomes larger than the thrust Fs by the solenoid 152, the valve body 151 is pushed back to the direction of the arrow A. As a result, the second land portion 172 is returned into the second sliding portion 162, and the first land portion 171 is returned to a space between the first sliding portion 161 and the second sliding portion 162. As a result, the communication between the input port 162p and the output port 163p is shut off, and the output port 163p and the drain port 161p communicate with each other again. Therefore, the working oil in the pilot chamber 3 is discharged to the tank 5 through the output port 163p and the drain port 161p, and the secondary pressure is lowered.

The valve body 151 repeats the operation of reciprocating through the accommodating chamber 160 in the axial direction, and the inflow and discharge of the working oil into and from the pilot chamber 3 is repeated. Thus, the secondary pressure is controlled such that the thrust Fs by the solenoid 152 to the valve body 151 and the biasing force Fk by the coil spring 153 to the valve body 151 as well as the thrust Fa by the secondary pressure are balanced. That is, a leakage amount of the working oil from the input port 162p to the output port 163p and the leakage amount of the working oil from the output port 163p to the drain port 161p are balanced, whereby the secondary pressure is held.

When the supply of the control current to the solenoid 152 is stopped, the solenoid 152 is demagnetized, and the thrust Fs by the solenoid 152 is lost. Thus, the valve body 151 is moved to the direction of the arrow A by the biasing force Fk of the coil spring 153 and the thrust Fa by the secondary pressure and is returned to the closed position (C) in the state where the push rod 74 abuts to the stopper portion 75. Since the output port 163p and the drain port 161p communicate with each other at the closed position (C), the pressure of the pilot chamber 3 (secondary pressure) is lowered to the tank pressure PO.

The thrust Fs by the solenoid 152 is adjusted by a value of the control current supplied to the solenoid 152. Thus, the secondary pressure (control pressure) output to the pilot chamber 3 is controlled by the value of the control current to the solenoid 152.

According to the embodiment described above, the following working effects are exerted.

(1) The cap 101 has the primary pressure passage 141 which leads the working oil at the primary pressure to the electromagnetic proportional valve 150 from the supply port 111, the secondary pressure passage 142 which leads the working oil whose pressure was reduced to the secondary pressure by the electromagnetic proportional valve 150 to the pilot chamber 3, and the drain passage 143 which leads the working oil discharged from the electromagnetic proportional valve 150 to the discharge port 112. Thus, the specification can be changed to the one in which the pilot pressure is controlled by the electromagnetic proportional valve 150 only by replacing the existing cap with the cap 100 with electromagnetic proportional valve according to this embodiment with respect to the control valve with the specification in which the pilot pressure is not controlled by the electromagnetic proportional valve 150. That is, according to this embodiment, the specification in which the pilot pressure is not controlled by the electromagnetic proportional valve 150 can be easily changed to the specification which executes the control.

(2) Since the supply port 111 and the discharge port 112 are provided on the surface different from the mounting surface 101a, a pipeline communicating with the hydraulic pump 4 and the tank 5 can be directly connected to the cap 101. When the supply port 111 and the discharge port 112 are provided on the mounting surface 101a, a passage communicating with the supply port 111 and the discharge port 112 needs to be provided in the valve housing 1, and the aforementioned specification change cannot be made easily. On the other hand, in this embodiment, as described above, since the supply port 111 and the discharge port 112 are provided on the surface different from the mounting surface 101a, there is no need to provide a passage which communicates with the supply port 111 and the discharge port 112 in the valve housing 1, and the change can be made easily to the specification in which the pilot pressure is controlled by the electromagnetic proportional valve 150.

The following variations are also within the range of the present invention, and the configuration illustrated in the variation can be combined with the configuration described in the aforementioned embodiment, or the configurations described in the following different variations can be also combined.

<Variation 1>

In the aforementioned embodiment, the example in which the plurality of pilot chambers 3 and the plurality of electromagnetic proportional valves 150 are provided in the cap 101 is described, but the present invention is not limited to that. The present invention can be also applied to a case in which the single pilot chamber 3 and the single electromagnetic proportional valve 150 are provided in the cap 101.

<Variation 2>

In the aforementioned embodiment, the example of a direct proportional pressure reducing valve in which the higher the current supplied to the solenoid 152 becomes, the more the secondary pressure is raised is described, but the present invention is not limited to that. The electromagnetic proportional valve 150 may be an inverse proportional pressure reducing valve in which the higher the current supplied to the solenoid 152 becomes, the more the secondary pressure is lowered.

The configurations, actions, and effects of the embodiment of the present invention configured as above will be collectively described.

The cap 100 with electromagnetic proportional valve includes a pilot cap 101 mounted on the valve housing 1 in which the spool 2 is incorporated and defines the pilot chamber 3 together with the valve housing 1 and the electromagnetic proportional valve 150 mounted on the pilot cap 101 and controlling the pressure of the working fluid supplied to the pilot chamber 3, and the pilot cap 101 has the supply port 111 to which the working fluid of the fluid pressure supply source (hydraulic pump 4) is supplied, the discharge port 112 from which the working fluid is discharged to the tank 5, the primary pressure passage 141 which leads the working fluid at the primary pressure to the electromagnetic proportional valve 150 from the supply port 111, the secondary pressure passage 142 which leads the working fluid whose pressure is reduced to the secondary pressure by the electromagnetic proportional valve 150 to the pilot chamber 3, and the drain passage 143 which leads the working fluid discharged from the electromagnetic proportional valve 150 to the discharge port 112.

In this configuration, the pilot cap 101 has the primary pressure passage 141, the secondary pressure passage 142, and the drain passage 143. Thus, with respect to the control valve with the specification in which the pilot pressure is not controlled by the electromagnetic proportional valve 150, the specification can be changed to the one in which the pilot pressure is controlled by the electromagnetic proportional valve 150 only by replacing the existing pilot cap with the pilot cap 101. That is, the specification in which the pilot pressure is not controlled by the electromagnetic proportional valve 150 can be easily changed to the specification which executes the control.

In the cap 100 with electromagnetic proportional valve, the pilot cap 101 has the mounting surface 101a mounted on the side surface 1a of the valve housing 1, and the supply port 111 and the discharge port 112 are provided on the surface different from the mounting surface 101a.

In this configuration, since the supply port 111 and the discharge port 112 are provided on the surface different from the mounting surface 101a, the pipeline communicating with the fluid pressure supply source (hydraulic pump 4) and the tank 5 can be directly connected to the pilot cap 101. Thus, there is no need to provide a passage communicating with the supply port 111 and the discharge port 112 in the valve housing 1, and the change can be easily made to the specification in which the pilot pressure is controlled by the electromagnetic proportional valve 150.

In the cap 100 with electromagnetic proportional valve, the pilot chambers 3 are provided in plural, the electromagnetic proportional valves 150 are provided in plural correspondingly to the plurality of pilot chambers 3, the electromagnetic proportional valve 150 has the valve body 151, the solenoid 152 which gives a thrust to the valve body 151, and a biasing member (coil spring 153) which gives a biasing force in the direction against the thrust of the solenoid 152 to the valve body 151, the pilot cap 101 has the accommodating chamber 160 which accommodates the valve body 151, the accommodating chamber 160 has the primary pressure chamber 181 which communicates with the primary pressure passage 141, the secondary pressure chamber 182 which communicates with the secondary pressure passage 142, and the drain chamber 183 which communicates with the drain passage 143, the primary pressure passage 141 has the main primary pressure passage 141a which extends linearly along the direction orthogonal to the axial direction of the spool 2 from the supply port 111 and the plurality of sub primary pressure passages 141b which allows the main primary pressure passage 141a to communicate with the primary pressure chamber 181 provided correspondingly to each of the plurality of electromagnetic proportional valves 150, and the drain passage 143 has the main drain passage 143a which linearly extends along the direction orthogonal in the axial direction of the spool 2 from the discharge port 112 and the plurality of sub drain passages 143b which allows the main drain passage 143a to communicate with the drain chamber 183 provided correspondingly to each of the plurality of electromagnetic proportional valves 150.

In this configuration, since the main primary pressure passage 141a and the main drain passage 143a can be used in common for the plurality of electromagnetic proportional valves 150, the size of the pilot cap 101 can be reduced.

The cap 100 with electromagnetic proportional valve is provided so that the main primary pressure passage 141a and the main drain passage 143a are in parallel with each other.

In this configuration, since the main primary pressure passage 141a and the main drain passage 143a are provided in parallel with each other, the size of the pilot cap 101 can be further reduced.

In the cap 100 with electromagnetic proportional valve, the valve body 151 is provided slidably in the direction orthogonal to each of the axial direction of the spool 2 and the main primary pressure passage 141a, and the main primary pressure passage 141a and the main drain passage 143a are provided at positions shifted in the axial direction of the spool 2 and in the axial direction of the valve body 151.

In this configuration, since the main primary pressure passage 141a and the main drain passage 143a are provided at positions shifted in the axial direction of the spool 2 and in the axial direction of the valve body 151, the size of the pilot cap 101 can be further reduced.

In the cap 100 with electromagnetic proportional valve, the main primary pressure passage 141a is disposed so as to face the pilot chamber 3 with the valve body 151 between them, and the main drain passage 143a is disposed so as to face the solenoid 152 with the valve body 151 between them.

In this configuration, since the valve body 151 is disposed between the pilot chamber 3 and the main primary pressure passage 141a and between the solenoid 152 and the main drain passage 143a, the size of the pilot cap 101 can be further reduced.

The embodiments of the present invention described above are merely illustration of some application examples of the present invention and not of the nature to limit the technical scope of the present invention to the specific constructions of the above embodiments.

The present application claims a priority based on Japanese Patent Application No. 2018-087393 filed with the Japan Patent Office on Apr. 27, 2018, all the contents of which are hereby incorporated by reference.

The invention claimed is:

1. A cap with electromagnetic proportional valve, comprising:
   a pilot cap which is detachable from a valve housing and is mounted on the valve housing in which a spool is incorporated, the pilot cap defining a pilot chamber with the valve housing; and an electromagnetic proportional valve mounted on the pilot cap and adapted to control, including to reduce, a pressure of a working fluid supplied to the pilot chamber, wherein the pilot cap has:
- a supply port into which a working fluid of a fluid pressure supply source is supplied;
- a discharge port from which the working fluid is discharged to a tank;
- a primary pressure passage which leads the working fluid at a primary pressure to the electromagnetic proportional valve from the supply port;
- a secondary pressure passage which leads the working fluid, the pressure of which is reduced to a secondary pressure by the electromagnetic proportional valve, to the pilot chamber; and
- a drain passage which leads the working fluid discharged from the electromagnetic proportional valve to the discharge port.

2. The cap with electromagnetic proportional valve according to claim 1, wherein the pilot cap has a mounting surface mounted on a side surface of the valve housing; and the supply port and the discharge port are provided on a surface different from the mounting surface.

3. A cap with electromagnetic proportional valve according to claim 1, comprising:

a pilot cap mounted on a valve housing in which a spool is incorporated, the pilot cap defining a pilot chamber with the valve housing; and an electromagnetic proportional valve mounted on the pilot cap and adapted to control, including to reduce, a pressure of a working fluid supplied to the pilot chamber, wherein the pilot cap has:
- a supply port into which a working fluid of a fluid pressure supply source is supplied;
- a discharge port from which the working fluid is discharged to a tank;
- a primary pressure passage which leads the working fluid at a primary pressure to the electromagnetic proportional valve from the supply port;
- a secondary pressure passage which leads the working fluid, the pressure of which is reduced to a secondary pressure by the electromagnetic proportional valve, to the pilot chamber; and
- a drain passage which leads the working fluid discharged from the electromagnetic proportional valve to the discharge port, the pilot chamber is provided in plural, the electromagnetic proportional valve is provided in plural correspondingly to the plurality of pilot chambers, each electromagnetic proportional valve has:
- a valve body;
- a solenoid which gives a thrust to the valve body; and
- a biasing member which gives a biasing force in a direction against the thrust of the solenoid to the valve body, the pilot cap has an accommodating chamber which accommodates the valve body, the accommodating chamber has:
- a primary pressure chamber which communicates with the primary pressure passage;
- a secondary pressure chamber which communicates with the secondary pressure passage; and
- a drain chamber which communicates with the drain passage, the primary pressure passage has a main primary pressure passage which extends linearly along a direction orthogonal to an axial direction of the spool from the supply port and a plurality of sub primary pressure passages which allows the main primary pressure passage and the primary pressure chamber provided correspondingly to each of the plurality of electromagnetic proportional valves to communicate with each other, and the drain passage has a main drain passage which extends linearly along the direction orthogonal to the axial direction of the spool from the discharge port and a plurality of sub drain passages which allows the main drain passage and the drain chamber provided correspondingly to each of the plurality of electromagnetic proportional valves to communicate with each other.

4. The cap with electromagnetic proportional valve according to claim 3, wherein the main primary pressure passage and the main drain passage are provided in parallel with each other.

5. The cap with electromagnetic proportional valve according to claim 4, wherein the valve body is provided slidably in a direction orthogonal to each of the axial direction of the spool and the main primary pressure passage; and the main primary pressure passage and the main drain passage are provided at positions shifted in the axial direction of the spool and in the axial direction of the valve body.

6. The cap with electromagnetic proportional valve according to claim 5, wherein the main primary pressure passage is disposed to face the pilot chamber with the valve body between them; and the main drain passage is disposed to face the solenoid with the valve body between them.

* * * * *